US007163634B2

(12) United States Patent
Morton

(10) Patent No.: US 7,163,634 B2
(45) Date of Patent: Jan. 16, 2007

(54) COMPOSITIONS FOR REMOVING METAL IONS FROM AQUEOUS PROCESS SOLUTIONS AND METHODS OF USE THEREOF

(76) Inventor: Peter Morton, deceased, late of East Palo Alto, CA (US); by Riva Morton, legal representative, 717 Summit Dr., Laguna Beach, CA (US) 92651

( * ) Notice: Subject to any disclaimer, the term of this patent is extended or adjusted under 35 U.S.C. 154(b) by 119 days.

(21) Appl. No.: 10/945,685

(22) Filed: Sep. 21, 2004

(65) Prior Publication Data

US 2006/0060538 A1 Mar. 23, 2006

Related U.S. Application Data

(62) Division of application No. 10/211,406, filed on Aug. 1, 2002, now Pat. No. 6,818,135.

(60) Provisional application No. 60/309,854, filed on Aug. 3, 2001, provisional application No. 60/309,837, filed on Aug. 3, 2001, provisional application No. 60/309,836, filed on Aug. 3, 2001.

(51) Int. Cl.
*C02F 1/42* (2006.01)
(52) U.S. Cl. ..................................... 210/688; 526/288
(58) Field of Classification Search ................ 210/688; 526/288
See application file for complete search history.

(56) References Cited

U.S. PATENT DOCUMENTS

| 1,855,035 | A |   | 4/1932 | Vignos |
| 3,951,790 | A |   | 4/1976 | Fujisawa et al. |
| 3,966,601 | A |   | 6/1976 | Stevenson et al. |
| 4,032,416 | A |   | 6/1977 | Cutler |
| 4,048,416 | A |   | 9/1977 | Axen |
| 4,053,400 | A |   | 10/1977 | Merker et al. |
| 4,133,755 | A |   | 1/1979 | Tarao et al. |
| 4,234,455 | A | * | 11/1980 | Homeier et al. ............... 502/62 |
| 4,239,865 | A |   | 12/1980 | Tarao et al. |
| 4,770,788 | A | * | 9/1988 | Vignola ....................... 210/670 |
| 4,971,775 | A |   | 11/1990 | Hoy et al. |
| RE34,272 | E |   | 6/1993 | Michaud et al. |
| 5,492,620 | A |   | 2/1996 | Evans |
| 5,615,862 | A |   | 4/1997 | Gaudette |
| 5,649,895 | A |   | 7/1997 | Fix et al. |
| 5,665,324 | A |   | 9/1997 | Izawa et al. |
| 5,772,776 | A |   | 6/1998 | Holbein |
| 5,908,559 | A |   | 6/1999 | Kresiler |
| 5,969,019 | A |   | 10/1999 | Kanai et al. |
| 6,274,045 | B1 |   | 8/2001 | Kreisler |
| 6,492,525 | B1 | * | 12/2002 | Bertrand et al. ............ 548/101 |
| 2005/0215814 | A1 | * | 9/2005 | Chaudhari et al. .......... 560/232 |

FOREIGN PATENT DOCUMENTS

CN 1069008 2/1993
EP 0116989 8/1984
JP 52094888 8/1977
JP 53015283 2/1978
JP 53149189 12/1978
JP 9066275 11/1997
JP 2001288579 10/2001
KR 8501079 7/1985
RU 1727054 A1 4/1992

OTHER PUBLICATIONS

EP Search Report dated Oct. 5, 2005.
Victoriano et al., "Crystal and Molecular Structures of a Neutral Pentanuclear Copper(I)—Iodide Complex," Inorganic Chemistry, 1998, vol. 37, pp. 2060-2062.
Chieh, "Synthesis and crystal structure of diiodotetraethylthiuramdisulfidemercury(II)," Canadian Journal of Chemistry, 1997, vol. 55, No. 7, pp. 1115-1119.
Contreras et al., Transition Metal Complexes of Thiurams, Spectrochemical Studies of Chromium(III) Complexes, J. of Inorganic Chemistry, 1971, vol. 33, pp. 1337-1343.
Fernandez et al., "Dithiocarbamate Ligands as Building-Blocks in the Coordination Chemistry of Gold," Inorganic Chemistry, 1998, vol. 37, pp. 5532-5536.
U.S. Appl. No. 10/212,028, filed Aug. 1, 2002, Inventor: Peter Morton, Title: Compositions for Removing Metal Ions From Aqueous Process Solutions and Methods of Use Thereof.
U.S. Appl. No. 10/211,471, filed Aug. 1, 2002, Inventor: Peter Morton, Title: Process for Reducing the Passive Layer From the Surface of a Metal.
U.S. Appl. No. 10/211,406, filed Aug. 1, 2002, Inventor: Peter Morton, Title: Compositions for Removing Metal Ions From Aqueous Process Solutions and Methods of Use Thereof.
Yoshida, H. et al., "Extraction of Several Metallic Complexes With Tetraethylthiuram Disulfide", Bunseki Kagaku , 1967, vol. 16(6), pp. 605-607.
Kakowski, I.A., "Reaction Between Disulfides and the Surfaces of Metals", Revista Minelo, 1957, vol. 8 , pp. 499-502.
Mendoza, C.S. et al., "Silver Extraction for Pollution Control of Photographic Fixing Solution with Tetramethylthiuram Disulfide", Bulletin of the Chemical Society of Japan, 1996, vol. 69(12), pp. 3499-3504.
Mendoza, C.S. et al., "Thiuram Sulfides as a Reagent for the Solvent Extraction of Silver", Analytical Sciences, 1996, vol. 12(6) , pp. 969-972.
Kobayashi, N. et al., "Sulfur-Containing Polymers XIX. Adsorption of Mercury From Aqueous Solutions By Thiuram Polysulfide Polymers", Journal of Polymer Science, Polymer Letters Edition, 1977, vol. 15(3) , pp. 137-140.

* cited by examiner

*Primary Examiner*—Robert A. Hopkins
(74) *Attorney, Agent, or Firm*—Dergosits & Noah LLP

(57) ABSTRACT

The present invention provides a composition and process using the composition for removing metal ions from aqueous process solutions. These compositions include a non-metallic compound entrapped within or supported onto a substrate. In one embodiment, the non-metallic compound is a thiuram. In another embodiment, the compositions further include non-metallic compound that is a dithiocarbamate. These compositions are contacted with the metal ions in the aqueous process solution to form an organometallic complex precipitate.

21 Claims, No Drawings

COMPOSITIONS FOR REMOVING METAL IONS FROM AQUEOUS PROCESS SOLUTIONS AND METHODS OF USE THEREOF

CROSS-REFERENCE TO RELATED APPLICATION

The present application is a divisional of application Ser. No. 10/211,406 filed on Aug. 1, 2002, issued as U.S. Pat. No. 6,818,135, which claims priority to U.S. provisional patent application Nos. 60/309,836, 60/309,837 and 60/309,854, all filed on Aug. 3, 2001, which are all incorporated herein by reference in their entirety.

FIELD OF INVENTION

The present invention describes a composition and process using the composition for removal of metal ions from aqueous process solutions.

BACKGROUND OF THE INVENTION

Various metals are used in many useful industrial processes. For example, silver is used in many image-forming industrial processes, such as photography, thermography, and photothermography. Such processes, however, result in waste solutions containing metal ions at levels that may be undesirable to the environment. In addition, many countries now have laws that control the levels of certain metal ions that can be released into the environment. Since commercial disposal of large volumes of untreated waste solutions can be costly, there has been a concerted effort to treat the waste solutions in a cost effective manner. Furthermore, these metals can be of sufficient value to justify their recovery.

Metals have been removed from aqueous waste solutions utilizing processes such as ion exchange, electrolysis, and settling. However, all of these known processes have their limitations. Ion exchange is costly, slow and impractical. The ion exchange resins are expensive because they require complex and sophisticated fabrication processes. Some of this cost can be recouped by regenerating the ion exchange resins. However, the waste solutions produced during regeneration typically have to be treated. Similarly, electrolysis is also costly due to maintenance, resource requirements, and energy input. Electrolysis is also very sensitive to contaminants and generally provides ineffective levels of metal recovery.

Settling processes typically use one or more agents that transform the metals into materials that are no longer soluble in the system and settle to the bottom of the tank. However, currently known settling processes have the following limitations. Undesirably large amounts of sludge, which cannot be regenerated, can be formed. Some settling processes require heating to very high temperatures, e.g., greater than 80° C., to provide useful results. Still others require the use of a change in pH to cause the transformation of the metal into an insoluble material.

Accordingly, there is a need for effective recovery of metal ions from aqueous waste solutions (hereafter also referred to as aqueous process solutions).

SUMMARY OF THE INVENTION

The present invention is directed to a composition and the use of the composition in a process that effectively removes metal ions from aqueous process solutions.

The composition includes a non-metallic compound, which is capable of forming a complex with a metal ion, entrapped within or supported onto a support material. In one embodiment of the present invention the non-metallic compound is a thiuram. In another embodiment of the composition, the composition further includes a dithiocarbamate entrapped within or supported onto the support material. These compositions can be obtained by a process of contacting a non-metallic compound composition with a support material. The non-metallic compound composition can include the thiuram or a combination of thiuram and dithiocarbamate. The present invention is also directed to the composition obtained by this process.

In another aspect of the present invention, a process is disclosed for removing metal ions from an aqueous process solution utilizing the compositions of the present invention. The process includes reacting the metal ions in the aqueous process solution with a treatment composition having a non-metallic compound entrapped within or supported onto a support material. The metal ions and the non-metallic compound can form an organometallic complex. It is preferred to have a wetting agent present in the aqueous process solution.

The present invention is also directed to a product, an organometallic composition, obtained from the processes described above. The organometallic composition includes an organometallic complex entrapped within or supported onto a support material, wherein the organometallic complex includes a non-metallic compound associated with a metallic ion.

DETAILED DESCRIPTION OF THE INVENTION

The present invention provides treatment compositions and processes using the compositions for removing metal ions from aqueous process solutions. The present invention also provides novel organometallic complexes resulting from the processes. The term "aqueous process solution," as used herein, means any liquid containing from about 1 ppm to about 15,000 ppm of metal ions. The term "about," as used herein, means plus or minus 10% of the referenced value. The term "aqueous", as used herein, means containing greater than about 50%, by weight of the solution, of water or a water miscible solvent. The processes used herein for aqueous process solutions can also be used for appropriate gaseous process mixtures. Nonlimiting examples of aqueous process solutions include the processing solutions from the following technologies: photography, photothermography, thermography, lithography, metallurgy, semiconductor polishing, and x-ray imaging. The term "metal ion," as used herein, means the soluble form of any metal in Groups IB through VIIB and VIII of the periodic table (according to CRC Handbook of Chemistry and Physics, 62nd Edition, 1981–1982), including the elements having the atomic numbers of 58–71 and 90–103, aluminum, gallium, indium, thallium, germanium, tin, lead, antimony, bismuth, mixtures thereof, and alloys thereof. Metal ions of particular interest are those identified in the Resource Conservation Recovery Act (RCRA). Metal ions are preferably selected from the group consisting of arsenic, barium, cadmium, chromium, cesium, copper, iron, lead, mercury, nickel, selenium, silver, technetium, thallium, zinc, actinides, lanthanides, mixtures thereof, and alloys thereof.

The treatment compositions of the present invention include a non-metallic compound that is entrapped within and/or supported onto a support material. Typically, the treatment composition includes from about 5% to 60%, preferably from about by 20% to about 40%, by weight of the composition, of a non-metallic compound, which can associate with a metal ion, and from about 40% to about 95%, preferably from about 60% to about 80%, by weight of the composition, of a support material. The non-metallic compound is preferably not a polymer.

Without wanting to be limited by any one theory, it is believed that the non-metallic compounds of the present invention form an organometallic complex with the metal ion. Since the non-metallic compound is entrapped within and/or supported onto the support material, the resulting organometallic complex is also entrapped within and/or supported onto the support. When the treatment composition reaches a level of unacceptable performance, e.g., when the most of the non-metallic compound has been converted to the organometallic complex, the treatment composition can simply be replaced. The spent treatment composition can then be further processed, as described in greater detail below.

In one embodiment of the present invention, the treatment compositions of the present invention include a non-metallic compound that is a thiuram, which can also be referred to as thiram. Thiuram is sparingly soluble in the aqueous process solution. The term "sparingly soluble," as used herein, means that less than 0.1% by weight of the material is soluble in the aqueous process solution. One group of thiurams can be characterized by the general chemical formula (I), as illustrated below.

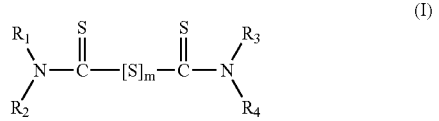

(I)

wherein, m is an integer of 1 or 2; and $R_1$, $R_2$, $R_3$, and $R_4$ are individually selected from the group consisting of C1–C10 linear alkyls, C3–C10 branched alkyls, C3–C10 cyclo-alkyls, and substituted and unsubstituted aryls. As is well known to the skilled artisan, any of the carbon atoms or hydrogen atoms in each of the above described R-groups can be substituted with chemical moieties that tailor the performance of the non-metallic compound without significantly effecting the requisite solubility properties.

Examples of useful non-metallic compounds of formula (I) include, but are not limited to, tetramethylthiuram monosulfide (CAS# 97-74-5); bis(dimethyldithiocarbamoyl) disulfide (CAS# 137-26-8); tetrabenzylthiuram disulfide (CAS# 10591-85-2); tetraethylthiuram disulfide (CAS# 97-77-8); tetrabutylthiuram disulfide (CAS# 1634-02-2), dipentamethylenethiuram tetrasulfide (CAS# 120-54-7), and mixtures thereof.

In another embodiment of the present invention, the treatment compositions of the present invention further include a water soluble non-metallic compound that is a dithiocarbamate. One group of dithiocarbamates can be characterized by the general chemical formula (II), as illustrated below.

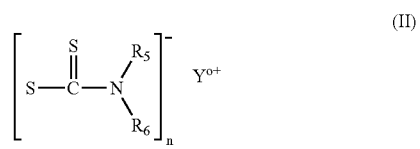

(II)

wherein, n is an integer of 1 or 2; o is an integer of 1 or 2; $R_5$ and $R_6$ are individually selected from the group consisting of C1–C10 linear alkyls, C3–C10 branched alkyls, C3–C10 cyclo-alkyls, and substituted and unsubstituted aryls; and Y is an element selected from Groups IA and IIA of the periodic table. As is well known to the skilled artisan, any of the carbon atoms or hydrogen atoms in each of the above described R-groups can be substituted with moieties that enhance the performance of the non-metallic compound.

Examples of useful non-metallic compounds of formula (II) include, but are not limited to, sodium dimethyldithiocarbamate (CAS# 128-04-1), sodium diethyldithiocarbamate (CAS# 148-18-5), sodium dibenzyldithiocarbamate (CAS# 55310-46-8), sodium dibutyldithiocarbamate (CAS# 136-30-1), and mixtures thereof.

The above-described non-metallic compounds are entrapped within and/or supported onto a support material. Any water insoluble material can be used as the support material. The term, "water insoluble material," as used herein, means that the material does not substantially dissolve in water. Accordingly, the support can be made of a hydrophilic material so long as the material does not substantially dissolve in water. The support is preferably made of a material that is capable of entrapping the non-metallic compound. More preferably, the support material is capable of entrapping the non-metallic compound and in an orientation that allows the active groups, e.g., the sulfur groups, to be available for association with the metal ions in the aqueous process solution. Accordingly, it is believed that support materials having cavities with hydrophobic characteristics are preferred for non-metallic compounds having hydrophobic R-groups. General examples of useful support materials include, but are not limited to, natural and synthetic polymers, organic compounds, inorganic compounds, and mixtures thereof.

Examples of useful polymers include, but are not limited, polyolefin powders and sheets, such as nylon, polyester, polyethylene, polypropylene, polycarbonate, polystyrene, polyacrylate, benzoguanamine resin, polytetrafluoroethylene, distyrene-benzene polymer, epoxy resin, and acrylic resin; and natural polymers, such as fine crystalline cellulose and polysaccharides. Particle sizes can be chosen to optimize fluid flow through the support material. One class of polymers that are also useful are natural and synthetic resins, that are polymeric materials having functional moieties that can be tailored to create affinity for certain types of compounds. Examples of useful resins include, but are not limited to, chelating resins, ion exchange resins, such as cationic or cationic resins; and resins used for water treatment, e.g., those having a styrene-divinylbenzene backbone (which are commercially available from Rohm and Haas Company as Ambersorb 563, Ambersorb 572, Amberlite IRC 718 and Amberlite XAD4). Such resins are available in powder, bead, and sheet forms.

Examples of useful organic compounds include, but are not limited to, carbon, granular activated carbon, nut shells, husks, stalks, wood and other sources of natural cellulose. The compounds can typically be used in granular forms, e.g., in 4/20, 12/40, and 20/50 mesh sizes.

Examples of useful inorganic compounds include, but are not limited to, metal oxides, such as silicon dioxide and titanium oxide; natural zeolite and synthetic zeolite; talc; kaolin; sericite; bentonite; muscovite; phlogopite; lepidolite; biotite; synthetic golden mica; vermiculite; diatomateous earth; magnesium silicate; calcium silicate; aluminum silicate; barium silicate; metallic tungstates; silica; hydroxylapatite; boron nitride; and ceramic powders.

The treatment compositions of the present invention can be obtained by contacting a non-metallic compound composition with a water insoluble support material in a liquid that is non-reactive. The non-metallic compound composition includes one or more of the above-described non-metallic compounds. Typically the liquid that is used is water, because of environmental and cost factors. When the support material is in the form of sheets, the non-metallic compound can also be painted onto the surface. Although the non-metallic compound can be absorbed into the support at a wide variety of process parameters, the rate of absorption can be enhanced by conducting the reaction with mixing at a temperature from about 0° C. to about 120° C. at standard pressures, and preferably from about 20° C. to about 100° C. After the absorption process is complete, the resulting treatment composition can be dried.

The present invention is also directed to a method or process of utilizing the treatment compositions of the present invention to remove metal ions from aqueous process solutions. Treated aqueous process solutions can have less than about 10 ppm, preferably less than about 5 ppm, and more preferably less than about 0.10 ppm of metal ions. Essentially, this process involves reacting the treatment composition containing the non-metallic compound with the aqueous process solution containing the metal ion. As discussed previously, it is believed that the metal ions react with the non-metallic compound to form an organometallic complex. It is believed that the organometallic complex is in the form of a precipitate that is entrapped in or supported on the support material.

It has been surprisingly found that the processes of the present invention can effectively remove metal ions to these low levels even in the presence of high concentrations of chelators. Chelators are typically used to maintain the metal ions in the process solution, thereby hindering their removal. The present process can be utilized to effectively remove metal ions in process solutions having chelator to metal ion numeric proportions of greater than about 500:1. In fact, the present process can also be effective in any of the following chelator to metal ion numeric proportions: from about 1,250,000:1 to about 10:1; from about 500,000:1 to about 20:1; and from about 100,000:1 to about 100:1.

It is also preferable for the aqueous process solution to have a wetting agent in a concentration from about 0.01 molar to 10 molar, more preferably from about 0.025 molar to 0.5 molar, and most preferably from about 0.05 molar to 0.25 molar. Some process solutions may already have a wetting agent as a component of the waste stream. For example, photographic waste solutions typically contain wetting agents in sufficient concentration. If the aqueous process solution does not contain a wetting agent, an appropriate amount of a wetting agent may be added. Wetting agents, also known as surfactants, are compounds that reduce the surface tension of liquids, or reduce interfacial surface tension between two liquids or a liquid and a solid. It is, therefore, believed that the wetting agent helps to lower the barrier of reaction. Wetting agents may be soluble in both organic and water solutions. However, it is preferred that the wetting agents used herein be at least soluble in the aqueous solution at the concentrations used. General categories of useful wetting agents include, but are not limited to, non-ionic surfactants, anionic surfactants, cationic surfactants, carboxylic acids, alcohols, and amines. Zwitter-ionic and amphoteric surfactants may also be useful. Examples of useful wetting agents are disclosed in the Kirk-Othmer Encyclopedia of Chemical Technology (John Wiley and Sons, New York), U.S. Pat. No. 6,399,676 issued to Labude, et al. on Jun. 4, 2002, and U.S. Pat. No. 6,087,312 issued to Masotti, et al on Jul. 11, 2000, all of which are incorporated herein by reference in their entirety. Examples of useful wetting agents include, but are not limited to, acetic acid, propanoic acid, methanol, ethanol, propanol, tetraethyl ammonium hydroxide, fatty acids and salts thereof, alkylaryl sulfonates, and mixtures thereof.

The present process can be conducted at wide variety of reaction variables, which can be tailored for optimization accordingly to any particular process. As in any chemical reaction, increasing the reaction or retention time, i.e., duration of physical contact of the non-metallic compound and the aqueous process solution, is beneficial to increasing the quantity and size of the precipitated organometallic complex. Accordingly, it is preferred to maximize the reaction or retention time as much as allowable taking into consideration other process and economic variables. Typically, the reaction or retention time is at least 0.1 hours, preferably from about 0.1 hours to about 125 hours, and more preferably from about 0.1 hours to about 12 hours. As is well understood by the skilled artisan, lower reaction or retention times can be needed at higher reaction temperatures.

The reaction can be conducted at a wide range of temperatures. Preferably, the reaction temperature is less than or equal to about 50° C., more preferably less than or equal to about 45° C., and most preferably at ambient temperatures. Ambient temperatures, as used herein, means the normal temperature range of the surrounding environment, which typically can range about from 5° C. to about 40° C. The processes of the present invention, therefore, can be conducted with little or no heating, thereby decreasing the cost of heat inputs to the system. However, a small amount of heating to achieve reaction temperatures within the above ranges may be desirable to achieve optimum processing results.

Lastly, the present process can be conducted at a wide range of pH's, especially if the process is conducted in a substantially oxygen-free environment. However, due to the increased possibility of organic materials being degraded by oxidized metal ions in oxygen rich environments, e.g., Fenton's reaction, it is preferred to conduct the process at a pH of greater than or equal to about 3.0, preferably from about 4.0 to 12.0, and more preferably from about 7.0 to 12.0. It is also believed that the present processes provide better separation of metal ions at lower surface tensions, e.g., at about the surface tension of 1% by weight of acetic acid in water.

In one embodiment of the present invention, the process involves introducing the treatment compositions of the present invention to the aqueous process solution in batch or continuous systems. Such systems can be run in parallel and/or in series. Such systems typically utilize a container, such as a tank, containing the aqueous process solution, and the container is adapted to provide mixing, e.g., by utilizing any mixing technology known to the skilled artisan. The treatment composition is added in a concentration that is proportion to the metal ions present in the aqueous process solution. In this embodiment, the treatment composition is added such that the non-metallic compound is present at a concentration of from about 100.0:1.0 to about 10.0:1.0, preferably from about 75.0:1.0 to about 20.0:1.0, and more preferably from about 60.0:1.0 to about 40.0:1.0 by molar ratio of the non-metallic compound to the metal ions present in the aqueous process solution. Some non-metallic compounds can even be effective at metal concentration levels of 1 ppm or less. More of the non-metallic compound may be needed at lower pH's, e.g., below about pH 4, in oxygen rich environments and when higher levels of contaminants are present, e.g., greater than about 5 ppm. Contaminants are any chemical compounds other than the metal ions and water.

When the removal of the metal ions reaches an unacceptable level, the spent treatment composition is simple replaced with a fresh one. The entrapped organometallic precipitate can then be further processed, as described hereinafter.

In another embodiment of the present process, the aqueous process solution containing the metal ions can be introduced to a bed of the treatment composition containing the non-metallic compound. In this embodiment, a reaction bed is packed with the treatment composition, and a flow of aqueous process solution is controlled through the bed via gravity or positive pressure to optimize the reaction or retention time of reaction in relation to other process and economic variables. The reaction bed can be in any acceptable geometric form. Typically, 1 mole of metallic ions will require about 50 moles of non-metallic compound, incorporated in a support material. More of the non-metallic compound may be needed at lower pH's, e.g., below about pH 4, in oxygen rich environments and when higher levels of contaminants are present, e.g., greater than about 5 ppm. The treatment composition in the reaction bed can be replaced when removal of metal ions has reached an unacceptable degree. The resulting precipitate entrapped in the support material can then be further processed, as described hereinafter.

Optional ingredients known to the skilled artisan can also be used to aid in or optimize any of the process steps described above. For example, flocculating agents can be used to aid in the settling process. Nonlimiting examples of flocculating agents include acrylates. Also, antifoaming agents can also be used in the mixing step, assuming that the degree of agitation is not changed. Nonlimiting examples of antifoaming agents include silicone oils.

As is well understood by the skilled artisan, the processes of the present invention can be used in conjunction with other conventionally known metal ion recovery systems, such as photochemical developer, fixer, and bleach-fix processing solutions involve metallic replacement, electrolytic recovery, chemical precipitation, ion exchange and reverse osmosis. For example, the aqueous process solution can first be treated electrolytically before the present process is used. Alternatively, the present process can be used first before electrolytic treatment.

As described above, it is believed that the non-metallic compounds of the present invention react with metal ions to form an organometallic complex. Without wanting to be limited by any one theory, it is believed that the metallic ion associates to one or more sulfur groups on the non-metallic compound via van der Waals forces, ionic forces, and/or delta bonds. The entrapped organometallic complex can, therefore, be further processed to recover the metal ions as native metal by removing these attractive forces by any method known to the skilled artisan. Alternatively, the complexed non-metallic compound can simply be removed by any method known to the skilled artisan. Examples of suitable removal techniques include, but are not limited to, oxidization, degradation, acidification, and flame refining.

EXAMPLES

Example 1

Synthesis of Granular Activated Carbon Supported Treatment Compositions

In a stainless steel container, about 716 grams of bis (dimethyldithiocarbamoyl) disulfide (CAS# 137-26-8) in powder form was added to about 1234 grams of 12/40 mesh granular activated carbon (GAC) derived from coconut shells. The container was filled with water and heated to reflux at about 100° C. The reaction was continued until the bis(dimethyldithiocarbamoyl) disulfide was no longer visible, and the appearance of the support material is similar to GAC in water, i.e., black in color. The reaction can typically be completed in about 12 to about 16 hours, depending on the amount of agitation. The water can then be removed to obtain the GAC supported treatment composition.

Example 2

Use of the Treatment Composition in a Column

The treatment composition obtained from Example 1 can be used in a fixed bed reactor, such as a column. Using a column as an example, the column housing may be in the form of a tube with proper connections at both ends to allow the aqueous process solution to enter and exit the column while maintaining the treatment composition in the column. Once the treatment composition is added to the column, the aqueous process solution can be slowly pumped into the column. This embodiment can provide treated solutions containing less than about 0.05 ppm of silver ions by adjusting the flow rate. Adjustment of the flow rate can compensate for other factors that can effect performance, such as the initial silver ion concentration, pH, and other metal ions.

A GAC supported treatment composition according to Example 1 was used to remove silver ions from a photochemical fixer solution having silver ions at a concentration of from about 50 to about 80 ppm. The experiment was conducted at a pH of about 7 and at a reaction temperature of about 20° C., as follows. About 25 pounds of a GAC supported treatment composition according to Example 1 was placed in a column having a volume of about 4 gallons. As is well known to the skilled artisan, the 4-gallon column can be replaced with four 1-gallon columns placed in series, or any combination to total the 4-gallon column. About 200 gallons of the photochemical fixer solution was then steadily pumped through the column at a rate of one gallon per hour. The retention time was about 4 hours. The treated aqueous solution was tested for silver ions using a Perkin Elmer flame atomic absorption spectrometer. The procedure for using such atomic absorption spectrometers to obtain concentrations of metal ions is well known in the art. The treated aqueous solution contained less than about 0.05 ppm of silver ions.

What is claimed is:

1. A product obtained from a process for removing metal ions from an aqueous process solution, comprising:
   reacting the metal ions in the aqueous process solution with a treatment composition comprising a non-metallic compound entrapped within a support material, wherein the metal ions and the non-metallic compound form an organometallic complex.

2. The product of claim 1, wherein the aqueous process solution further comprises a wetting agent.

3. The product of claim 1, wherein the reacting step is conducted at a temperature of less than or equal to about 50° C.

4. The product of claim 1, wherein the non-metallic compound is a thiuram.

5. The product of claim 4, wherein the thiuram is characterized by the general chemical formula (I),

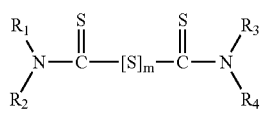
(I)

wherein, m is an integer of 1 or 2; and $R_1$, $R_2$, $R_3$, and $R_4$ are individually selected from the group consisting of C1–C10 linear alkyls, C3–C10 branched alkyls, C3–C10 cyclo-alkyls, and substituted and unsubstituted aryls.

6. The product of claim 5, wherein the thiuram is selected from the group consisting of tetramethyithiuram monosulfide, bis(dimethyldithiocarbamoyl) disulfide, tetrabenzylthiuram disulfide, tetraethylthiuram disulfide, tetrabutylthiuram disulfide, dipentamethylenethiuram tetrasulfide, and mixtures thereof.

7. The product of claim 4, wherein the treatment composition further comprises an additional non-metallic compound that is a dithiocarbamate entrapped within the support material.

8. The product of claim 7, wherein the dithiocarbamate is characterized by the general chemical formula (II),

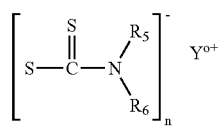
(II)

wherein, n is an integer of 1 or 2;
o is an integer of 1 or 2;
$R_5$ and $R_6$ are individually selected from the group consisting of C1–C10 linear alkyls, C3–C10 branched alkyls, C3–C10 cyclo-alkyls, and substituted and unsubstituted aryls; and
Y is an element selected from Groups IA and IIA of the periodic table.

9. The product of claim 8, wherein the dithiocarbamate is selected from the group consisting of sodium dimethyldithiocarbamate, sodium diethyldithiocarbamate, sodium dibenzyldithiocarbamate, sodium dibutyldithiocarbamate, and mixtures thereof.

10. The product according to any of claims 1, 4 or 7, wherein the support material is selected from the group consisting of natural and synthetic polymers, organic compounds, inorganic compounds, and mixtures thereof.

11. The product according to any of claims 1, 4 or 7, wherein the metal ion is selected from the group consisting of arsenic, barium, cadmium, chromium, cesium, copper, iron, lead, mercury, nickel, selenium, silver, technetium, thallium, zinc, actinides, lanthanides, mixtures thereof, and alloys thereof.

12. A product obtained from a process for removing metal ions from an aqueous process solution, comprising:
   reacting the metal ions in the aqueous process solution with a treatment composition comprising a non-metallic thiuram compound entrapped within a support material, wherein the metal ions and the non-metallic compound form a thiuram-metal complex.

13. The product of claim 12, wherein the aqueous process solution further comprises a wetting agent.

14. The product of claim 12, wherein the reacting step is conducted at a temperature of less than or equal to about 50° C.

15. The product of claim 12, wherein the thiuram is characterized by the general chemical formula (I),

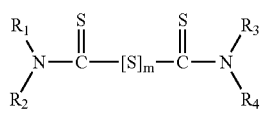
(I)

wherein, m is an integer of 1 or 2; and
$R_1$, $R_2$, $R_3$, and $R_{b\ 4}$ are individually selected from the group consisting of C1–C10 linear alkyls, C3–C10 branched alkyls, C3–C10 cyclo-alkyls, and substituted and unsubstituted aryls.

16. The product of claim 15, wherein the thiuram is selected from the group consisting of tetramethylthiuram monosulfide, bis(dimethylditbiocarbamoyl) disulfide, tetrabenzylthiuram disulfide, tetraethylthiuram disulfide, tetrabutylthiuram disulfide, dipentamethylenethiuram tetrasulfide, and mixtures thereof.

17. The product of claim 12, wherein the treatment composition further comprises an additional non-metallic compound that is a dithiocarbamate entrapped within the support material.

18. The product of claim 17, wherein the dithiocarbamate is characterized by the general chemical formula (II),

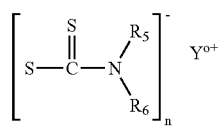
(II)

wherein, n is an integer of 1 or 2;
o is an integer of 1 or 2;
$R_5$ and $R_6$ are individually selected from the group consisting of C1–C10 linear alkyls, C3–C10 branched alkyls, C3–C10 cyclo-alkyls, and substituted and unsubstituted aryls; and
Y is an element selected from Groups IA and IIA of the periodic table.

19. The product of claim 18, wherein the dithiocarbamate is selected from the group consisting of sodium dimethyldithiocarbamate, sodium diethyldithiocarbamate, sodium dibenzyldithiocarbamate, sodium dibutyldithiocarbamate, and mixtures thereof.

20. The product according to any of claims 12 or 17, wherein the support material is selected from the group consisting of natural and synthetic polymers, organic compounds, inorganic compounds, and mixtures thereof.

21. The product according to any of claims 12 or 17, wherein the metal ion is selected from the group consisting of arsenic, barium, cadmium, chromium, cesium, copper, iron, lead, mercury, nickel, selenium, silver, technetium, thallium, zinc, actinides, lanthanides, mixtures thereof, and alloys thereof.

\* \* \* \* \*